US008552973B2

(12) United States Patent
Ono

(10) Patent No.: US 8,552,973 B2
(45) Date of Patent: Oct. 8, 2013

(54) LIQUID CRYSTAL DISPLAY DEVICE HAVING DISPLAY DIVIDED INTO FIRST AND SECOND DISPLAY REGIONS ALONG A BORDER LINE IN A DIRECTION IN WHICH SCANNING SIGNAL LINES EXTEND

(75) Inventor: Kikuo Ono, Mobara (JP)

(73) Assignees: Hitachi Displays Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 752 days.

(21) Appl. No.: 12/252,420

(22) Filed: Oct. 16, 2008

(65) Prior Publication Data

US 2009/0096944 A1 Apr. 16, 2009

(30) Foreign Application Priority Data

Oct. 16, 2007 (JP) ................................. 2007-268828

(51) Int. Cl.
*G09G 3/36* (2006.01)
*G02F 1/1343* (2006.01)

(52) U.S. Cl.
USPC .......................................... 345/103; 349/139

(58) Field of Classification Search
USPC .................................................... 345/87–104
See application file for complete search history.

(56) References Cited

U.S. PATENT DOCUMENTS

| | | | | |
|---|---|---|---|---|
| 6,421,041 | B2 * | 7/2002 | Yamazaki et al. | 345/103 |
| 6,825,834 | B2 | 11/2004 | Miyajima | |
| 7,119,776 | B2 | 10/2006 | Ishii et al. | |
| 7,136,040 | B1 * | 11/2006 | Park et al. | 345/100 |
| 7,978,273 | B2 * | 7/2011 | Takeuchi et al. | 349/39 |
| 8,441,013 | B2 * | 5/2013 | Hirato et al. | 257/59 |
| 2002/0070912 | A1 * | 6/2002 | Asuma et al. | 345/92 |
| 2003/0214496 | A1 * | 11/2003 | Ishii et al. | 345/204 |
| 2005/0105032 | A1 * | 5/2005 | Ono et al. | 349/139 |
| 2005/0184940 | A1 | 8/2005 | Oh et al. | |
| 2005/0225708 | A1 * | 10/2005 | Oke et al. | 349/139 |
| 2005/0280622 | A1 * | 12/2005 | Lee et al. | 345/96 |
| 2006/0051909 | A1 * | 3/2006 | Kimura | 438/151 |
| 2006/0146242 | A1 * | 7/2006 | Kim et al. | 349/129 |
| 2007/0035687 | A1 * | 2/2007 | Oke et al. | 349/143 |
| 2007/0052888 | A1 * | 3/2007 | Tak | 349/110 |

FOREIGN PATENT DOCUMENTS

| | | |
|---|---|---|
| JP | 08-022028 | 1/1996 |
| JP | 08-022029 | 1/1996 |
| JP | 10-048595 | 2/1998 |
| JP | 10-142629 | 5/1998 |
| JP | 10-268261 | 10/1998 |
| JP | 2002-207442 | 7/2002 |
| JP | 2003-330389 | 11/2003 |
| JP | 2004-341134 | 12/2004 |
| JP | 2007-524126 | 8/2007 |
| KR | 10-2002-0046022 | 6/2002 |
| KR | 10-2005-0058105 | 6/2005 |

* cited by examiner

*Primary Examiner* — Chanh Nguyen
*Assistant Examiner* — Navin Lingaraju
(74) *Attorney, Agent, or Firm* — Antonelli, Terry, Stout & Kraus, LLP.

(57) ABSTRACT

A liquid crystal display device where one display region of the liquid crystal display panel is divided into a first display region and a second display region along a border line in the direction in which scanning signal lines extend, a video signal line to which TFT elements of pixels in the first display region are connected and a video signal line to which TFT elements of pixels in the second display region are connected are electrically isolated from each other. Pixels having TFT elements connected to one of two adjacent video signal lines and pixels TFT elements connected to the other of the two adjacent video signal lines are alternate in a column of a number of pixels aligned in the direction in which the video signal lines extend in the first display region and the second display region.

9 Claims, 14 Drawing Sheets

LIQUID CRYSTAL DISPLAY DEVICE HAVING DISPLAY DIVIDED INTO FIRST AND SECOND DISPLAY REGIONS ALONG A BORDER LINE IN A DIRECTION IN WHICH SCANNING SIGNAL LINES EXTEND

The present application claims priority over Japanese Application JP2007-268828 filed on Oct. 16, 2007, the content of which is hereby incorporated into this application by reference.

BACKGROUND OF THE INVENTION (1) Field of the Invention

The present invention relates to a liquid crystal display device, and in particular, to a technology which is effective when applied to a liquid crystal display device where one display region is divided in two: a top region and a bottom region.

(2) Related Art Statement

Conventional liquid crystal display devices include liquid crystal televisions and liquid crystal displays connected to PC's (personal computers). The above described liquid crystal displays devices, such as liquid crystal televisions, usually display videos and images (that is to say, videos and still images) in a drive system, referred to as active matrix.

In liquid crystal display panels used in the above described active matrix type liquid crystal display devices, one display region is made up of a set of pixels having TFT elements and pixel electrodes, for example. The above described liquid crystal display panels are display panels where a liquid crystal material is sealed between a pair of substrates, and a number of scanning signal lines, a number of video signal lines, a number of TFT elements and a number of pixel electrodes are arranged on one of the above described pair of substrates (hereinafter referred to as TFT substrate). In addition, a light blocking film in net form which extends to such locations as to face the above described number of scan signal lines on the above described TFT substrate and in such locations as to face the above described number of video signal lines and a color filter, for example, are arranged on the other of the pair of substrates (hereinafter referred to as facing substrate).

In addition, counter electrodes which make pairs with the above described pixel electrodes when the liquid crystal molecules in the above described liquid crystal material are controlled (may be referred to as common electrodes) may be arranged on the above described TFT substrate or on the above described facing substrate, depending on the control method for the above described liquid crystal molecules.

In addition, in general active matrix type liquid crystal display panels, the gates of TFT elements of a number of pixels aligned in the direction in which the above described scanning signal lines extend are connected to one common scanning signal line in one display region. In addition, in general active matrix type liquid crystal display panels, the drains of TFT elements of a number of pixels aligned in the direction in which the above described video signal lines extend are connected to one common video signal line in one display region.

In addition, the screen size of liquid crystal display devices, such as liquid crystal televisions, has been increasing in recent years, that is to say, the area of one display region in the liquid crystal panels used has been increasing. In addition, the resolution of liquid crystal display devices, such as liquid crystal televisions, has been increasing in recent years, that is to say, the number of pixels that form one display region in the liquid crystal display panels used has been increasing. Therefore, in conventional, general liquid crystal display devices, for example liquid crystal display devices having signal input terminals for scanning signal lines only on the left of one display region and signal input terminals for video signal lines only at the top, the difference in delay of signals applied to a scanning signal line or a video signal line becomes great between pixels which are close to the signal input terminals and those which are and far away, and thus, the image quality tends to lower.

In order to prevent the picture quality from lowering as describe above, signal input terminals for scanning signal lines have been provided on the left and right of one display region, and signal input terminals for video signal lines provided on the top and bottom in liquid crystal display devices, for example, in recent years.

In addition, in the case where signal input terminals for video signal lines are provided on the top and bottom of one display region, one display region is divided into an upper region and an upper region along a border line in the direction in which the scanning signal lines extend, and the video signal lines connected to the drains of TFT elements of pixels which belong to the first display region above the above described border line and the video signal lines connected to the drains of TFT elements of pixels which belong to the second display region below the above described border line are electrically isolated from each other. In this configuration, videos and images can be displayed side-by-side in the above described first display region and the above described second display region. Therefore, the time required to display one frame for a video or an image becomes half of in the prior art, and thus, it becomes easy to deal with increase in the speed of display.

In the case where one display region is divided in two: a top region and a bottom region as described above, however, the image quality changes a great deal along the above describe border line, and the image quality may lower. Thus, various methods for preventing the image quality from lowering along the border line have been proposed for liquid crystal display devices where one display region is divided in two: a top region and a bottom region, so that videos and images are displayed in parallel on the above described first display region and the above described second display region (see for example Patent Document 1 and Patent Document 2).

(Patent Document 1) Japanese Unexamined Patent Publication H10 (1998)-268261

(Patent Document 2) Japanese Unexamined Patent Publication H8 (1996)-22028

SUMMARY OF THE INVENTION

Problem to be Solved by the Invention

In conventional, general active matrix type liquid crystal display panels, the drains of TFT elements of a number of pixels aligned in the direction in which video signal lines extend in one display region are connected to one common signal line. In addition, in the case of general liquid crystal display panels where one display region is divided in two: a top region and a bottom region, the drains of TFT elements of a number of pixels aligned in the direction in which video signal lines extend are connected to one common video signal line in the above described first display region, and the drains of TFT elements of a number of pixels aligned in the direction in which video signal lines extend are connected to another common video signal line in the above described second display region.

Therefore, in the case where a liquid crystal display device is driven in accordance with an inverting method, referred to as dot inversion, that is to say, in accordance with an inverting method where any two adjacent pixels in the direction in which scanning signal lines extend have opposite polarities and any two adjacent pixels in the direction in which video signal lines extend also have opposite polarities, the load of driver circuits for generating signals applied to the respective video signal lines increases, and the amount of heat emitted by these driver circuits increases. Therefore, a problem arises with conventional liquid crystal display devices driven through dot inversion, such that the driver circuits tend to easily break and malfunction.

Here, the polarity indicates the relationship between the potential of the signal from a video signal line stored in the pixel electrode (gradation voltage) and the potential of the counter electrode, and in general, cases where the potential of the pixel electrode is higher than the potential of the counter electrode are referred to as positive polarity, and cases where the potential of the pixel electrode is lower than the potential of the counter electrode are referred to as negative polarity.

In addition, in the case where a liquid crystal display device is driven in accordance with an inverting method, referred to as column inversion, that is to say, in accordance with an inverting method where any two adjacent pixels in the direction in which scanning signal lines extend have opposite polarities, and any two adjacent pixels in the direction in which video signal lines extend also have opposite polarities, for example, the load of the driver circuits for generating signals applied to the respective video signal lines becomes smaller than in the case of dot inversion. However, the number of pixels aligned in the direction in which the video signal lines extend all have the same polarity, and therefore, a problem arises, such that longitudinal smears and flickering (longitudinal streaks) appear, and the image quality lowers.

An object of the present invention is to provide a technology which makes it possible to reduce the heat emitted by the driver circuits in liquid crystal displays where one display region is divided into two regions for displaying videos and images side-by-side in two regions, as well as to prevent the image quality from lowering.

The above described and other objects and new features of the present invention will become clearer from the description in the present specification and the accompanying drawings.

Means for Solving Problem

The gist of typical inventions from among the inventions disclosed in the present specification is described below.

(1) A liquid crystal display device having: a liquid crystal display panel where a liquid crystal material is sealed between a first substrate and a second substrate, wherein the above described first substrate has a number of scanning signal lines, a number of video signal lines, a number of TFT elements and a number of pixel electrodes, the above described liquid crystal display panel has one display region made up of a set of pixels having a TFT element and a pixel electrode, the above described display region is divided into a first display region and a second display region along a border line in the direction in which the above described scanning signal lines extend, a video signal line to which the sources or drains of the TFT elements of pixels which belong to the above described first display region and a video signal line to which the sources or drains of the TFT elements of pixels which belong to the above described second display region are electrically isolated from each other, and pixels of which the source or drain of the TFT element is connected to one of any two adjacent video signal lines and pixels of which the source or drain of the TFT element is connected to the other of the two adjacent video signal lines alternate in a column of a number of pixels aligned in the direction in which video signal lines extend in the above described first display region, and in a column of a number of pixels aligned in the direction in which video signal lines extend in the above described second display region.

(2) The liquid crystal display device according to the above (1), wherein the arrangement of the TFT element and the pixel electrode in each pixel on the above described first substrate is one of line symmetry with the above described border line as the axis of symmetry between adjacent pixels which belong to the above described first display region and pixels which belong to the above described second display region with the above described border line in between.

(3) The liquid crystal display device according to the above (2), characterized in that signals of the same polarity are always applied to a number of video signal lines running through the above described first display region and a number of video signal lines running through the above described second display region during one frame period, signals of opposite polarities are applied to any two adjacent video signal lines in the same display region, in terms of signals applied to a number of video signal lines running through the above described first display region and a number of video signal lines running through the above described second display region during one frame period, and signals of opposite polarities are applied to the two facing video signals having the above described border line in between.

(4) The liquid crystal display device according to the above (1), wherein the arrangement of the TFT element and the pixel electrode in each pixel on the above described first substrate is one of point symmetry with the center of a line section on the above described border line along which two pixels are divided as the center of symmetry between adjacent pixels which belong to the above described first display region and pixels which belong to the above described second display region with the above described border line in between.

(5) The liquid crystal display device according to the above (4), wherein signals of the same polarity are always applied to a number of video signal lines running through the above described first display region and a number of video signal lines running through the above described second display region during one frame period, signals of opposite polarities are applied to any two adjacent video signal lines in the same display region, in terms of signals applied to a number of video signal lines running through the above described first display region and a number of video signal lines running through the above described second display region during one frame period, and signals of the same polarity are applied to the two facing video signals having the above described border line in between.

(6) The liquid crystal display device according to any of the above (1) to (5), wherein the gates of the TFT elements of pixels which belong to the above described first display region and the gates of the TFT elements of pixels which belong to the above described second display region are respectively connected to scan signal lines located on the signal input terminal side of the video signal lines to which the sources or drains of the above described TFT elements are connected relative to the pixel electrodes of the pixels.

(7) The liquid crystal display device according to the above (6), wherein the above described second substrate has a light blocking film in net form which extends to such locations as to face the above described number of scan signal lines and the above described number of video signal lines on the above described first substrate and locations through which the above described border line runs, and the size of the portion of the above described light blocking film extending to the location through which the above described border line runs in the direction in which the above described video signal lines extend is approximately the same as the size of the portion extending to such locations as to face the above described scanning lines in the direction in which the above described video signal lines extend.

Effects of the Invention

When videos and images are displayed side-by-side in two regions in the liquid crystal display device according to the present invention, where one display region is divided into two regions, heat emitted from the driver circuits for generating signals applied to the above described number of video signal lines can be reduced. In addition, in the liquid crystal display device according to the present invention, longitudinal smears can be prevented, for example, and thus, the image quality can be prevented from lowering due to longitudinal smears.

Furthermore, in the liquid crystal display device according to the present invention, the above described border line can be made inconspicuous.

BRIEF DESCRIPTION OF THE DRAWINGS

FIG. 1(*b*) is a schematic circuit diagram showing an example of the circuit configuration of one pixel in a display region of the liquid crystal display panel;

FIG. 1(*c*) is a schematic circuit diagram showing an example of a method for aligning pixels in the vicinity of the center of one of the two display regions;

FIG. 1(*d*) is a schematic circuit diagram showing an example of a method for aligning two adjacent pixels with the border line for dividing one display region in two in between;

FIG. 1(*e*) is a schematic circuit diagram showing another example of a method for aligning two adjacent pixels with the border line for dividing one display region in two in between;

FIG. 2(*b*) is a schematic diagram showing an example of a control method in the case where the respective pixels are aligned as shown in FIGS. 1(*c*) and 1(*e*);

FIG. 3(*b*) is a schematic cross sectional diagram along line A-A' in FIG. 3(*a*) and shows an example of the configuration of the TFT substrate;

FIG. 3(*c*) is a schematic cross sectional diagram along line B-B' in FIG. 3(*a*) and shows an example of the configuration of the TFT substrate;

FIG. 3(*d*) is a schematic cross sectional diagram along line C-C' in FIG. 3(*a*) and shows an example of the configuration of the TFT substrate;

FIG. 3(*e*) is a schematic plan diagram showing an example of the configuration of two adjacent pixels with the border line in between on the TFT substrate;

FIG. 4(*b*) is a schematic cross sectional diagram along line D-D' in FIG. 4(*a*) and shows an example of the configuration of the liquid crystal display panel;

FIG. 5(*b*) is a schematic cross sectional diagram along line E-E' in FIG. 5(*a*) and shows an example of the configuration of the liquid crystal display panel.

EXPLANATION OF SYMBOLS

Figure 1A:
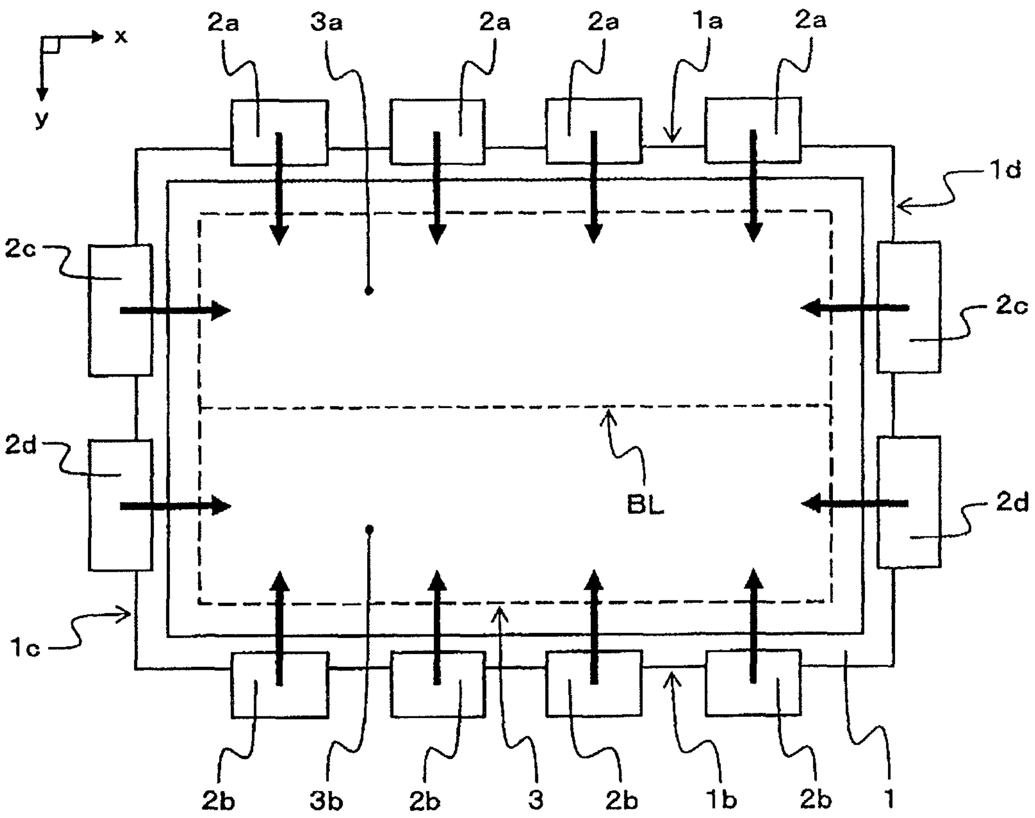
FIG. 1(*a*) is a schematic plan diagram showing an example of the configuration of the liquid crystal display panel and driver circuits in the liquid crystal display device of the present embodiment.
Figure 1B:
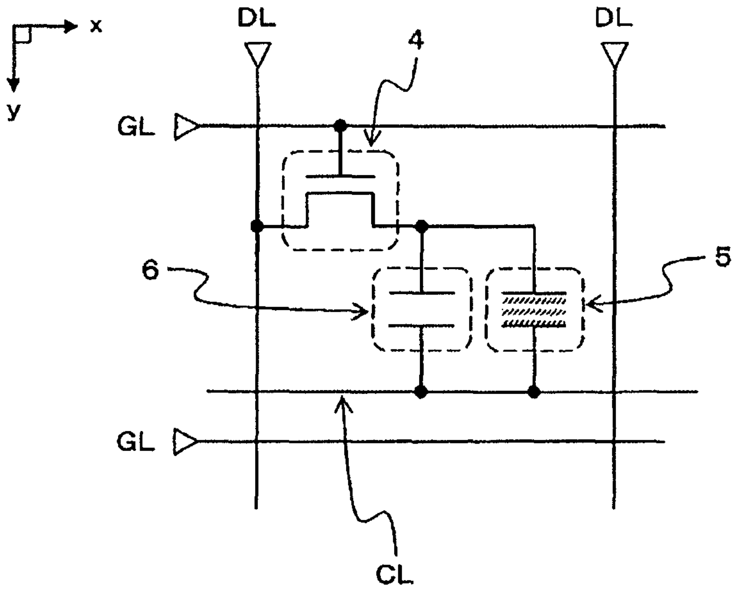
Figure 1C:
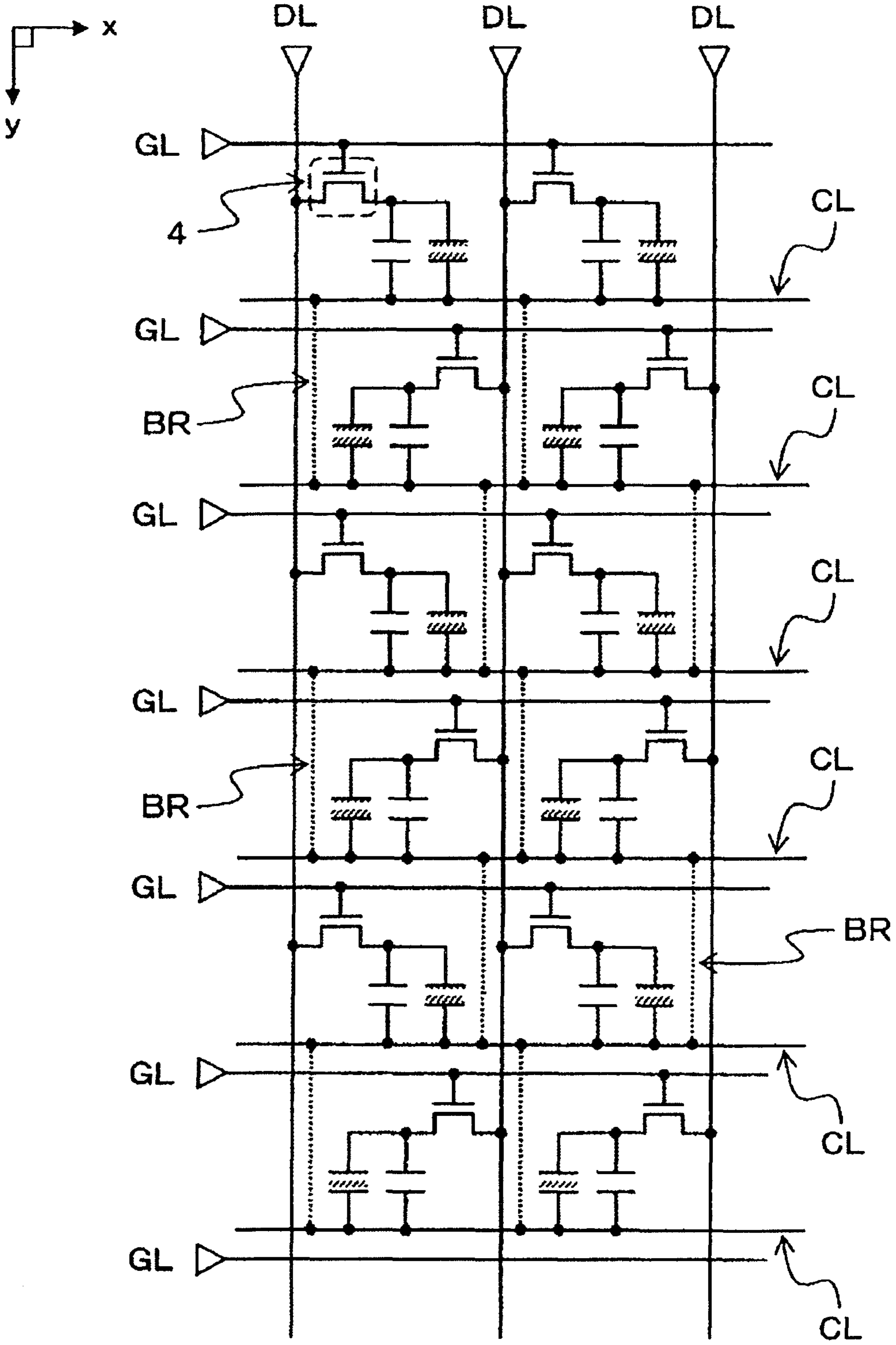
Figure 1D:
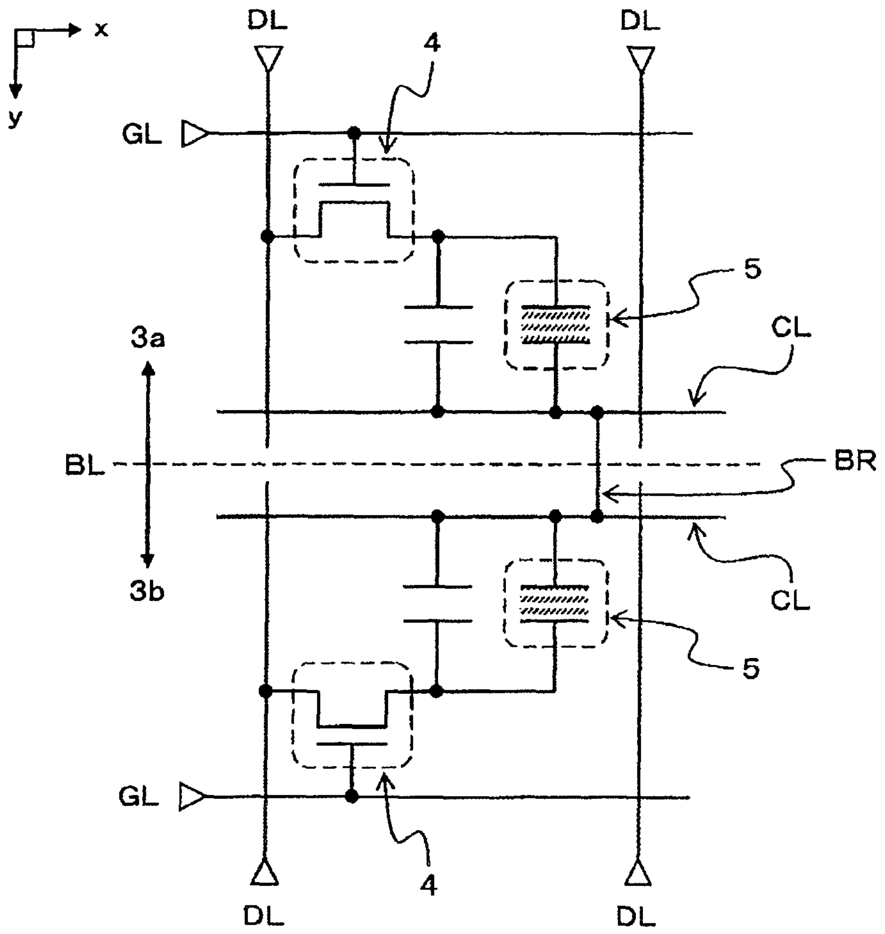
Figure 1E:
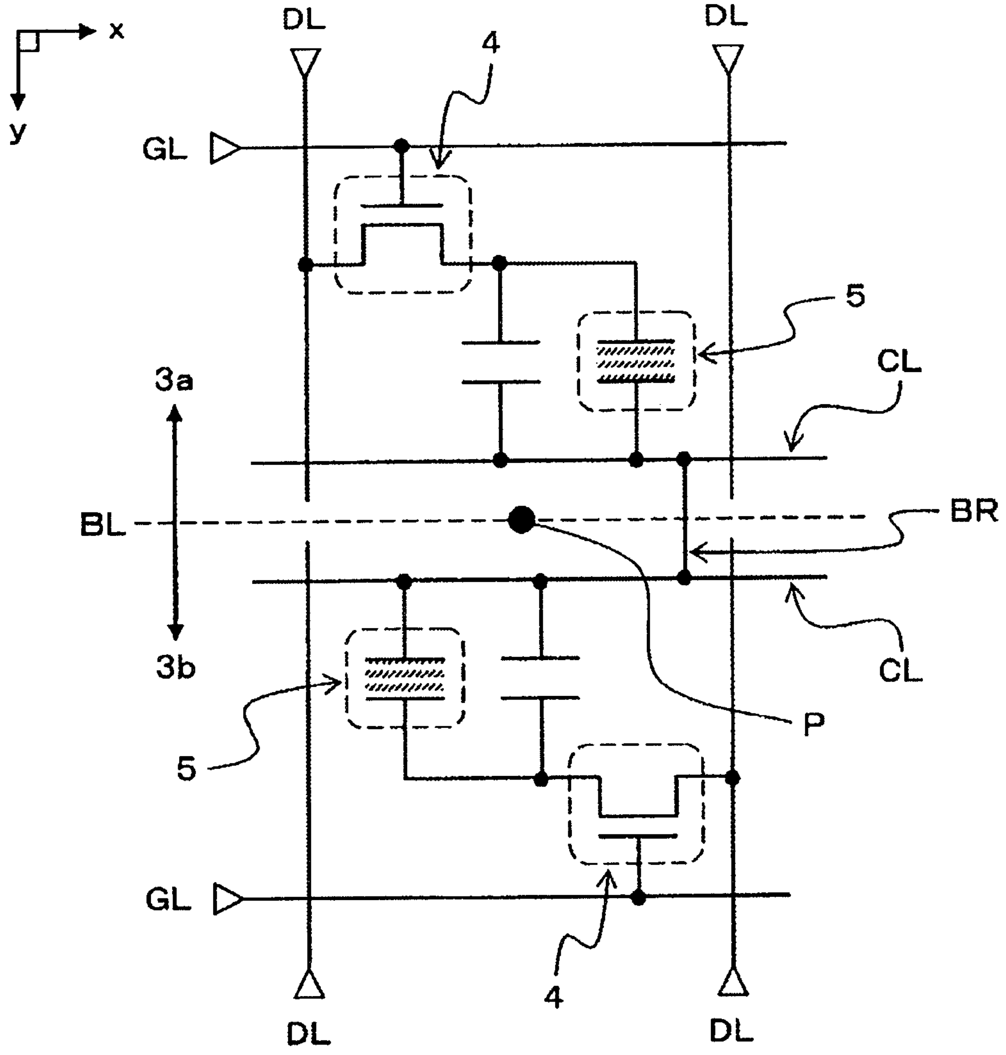

1 . . . liquid crystal display panel
2*a* . . . first driver circuit
2*b* . . . second driver circuit
2*c* . . . third driver circuit
2*d* . . . fourth driver circuit
3 . . . one display region
3*a* . . . first display region
3*b* . . . second display region
TFT . . . element
5 . . . pixel capacitor
6 . . . storing capacitor
7 . . . TFT substrate
8 . . . facing substrate
9 . . . liquid crystal material
GL . . . scanning signal line
DL . . . video signal line
CL . . . storing capacitor line
BR . . . bridge wire
SUB . . . insulating substrate
CT . . . counter electrode
PAS . . . first insulating layer
SC . . . semiconductor layer
SD1 . . . drain electrode
SD2 . . . source electrode
PAS2 . . . second insulating layer
PX . . . pixel electrode
ORI . . . orientation film
BM . . . light blocking film
CF . . . color filter
OC . . . overcoat layer

DETAILED DESCRIPTION OF THE INVENTION

Best Mode for Carrying Out the Invention

In the following, the present invention is described in detail, together with modes (embodiments), in reference to the drawings. Here, the same symbols are attached to components having the same functions in all of the drawings illustrating the embodiments, and the description thereof is not repeated.

Embodiment

FIGS. 1(*a*) to 1(*e*) are schematic diagrams showing the configuration of the liquid crystal display device according to one embodiment of the present invention.

FIG. 1(*a*) is a schematic plan diagram showing an example of the configuration of the liquid crystal display panel and driver circuits in the liquid crystal display device according to the present embodiment. FIG. 1(*b*) is a schematic circuit diagram showing an example of the circuit configuration of one pixel in a display region of the liquid crystal display panel. FIG. 1(*c*) is a schematic circuit diagram showing an example of a method for aligning pixels in the vicinity of the center of one of the two display regions. FIG. 1(*d*) is a schematic circuit diagram showing an example of a method for aligning two adjacent pixels with the border line for dividing one display region in two in between. FIG. 1(*e*) is a schematic circuit diagram showing another example of a method for aligning two adjacent pixels with the border line for dividing one display region in two in between.

Here, the direction x and the direction y in FIGS. 1(*b*) to 1(*e*) are the same as the direction x and the direction y shown in FIG. 1(*a*). In addition, the respective triangles at one end of the scanning signal lines and the video signal lines in FIGS. 1(*b*) to 1(*e*) indicate the direction in which signal input terminals are connected.

In the present embodiment, high-resolution liquid crystal display devices having a large screen, such as liquid crystal televisions, can be cited as an example of a liquid crystal display device to which the present invention is desired to be applied. As shown in FIG. 1(*a*), for example, first driver circuits 2*a*, second driver circuits 2*b*, third driver circuits 2*c* and fourth driver circuits 2*d* are attached to the four sides 1*a*, 1*b*, 1*c* and 1*d* of the liquid crystal display panel 1 in a high-resolution liquid crystal display device. In addition, one display region 3 of the liquid crystal display panel 1 is made up of a set of pixels having a TFT element and a pixel electrode, and divided into two regions: a top region and a bottom region, along a border line BL extending in the direction x. In the following description, the region above the border line BL in the display region 3 is referred to as first display region 3*a* and the region below the border line BL is referred to as second display region 3*b*.

The liquid crystal display panel 1 in the present embodiment is of an active matrix type, and a number of scanning signal lines, a number of video signal lines, a number of TFT elements, a number of pixel electrodes and counter electrodes are arranged on the liquid crystal display panel 1, not shown in FIG. 1(*a*). At this time, the number of scanning signal lines extend in the direction x and are aligned in the direction y. In addition, the number of video signal lines extend in the direction y and are aligned in the direction x. In addition, video signal lines running through the first display region 3*a* and video signal lines running through the second display region 3*b* are electrically isolated from each other by the portion of the bordering line BL.

In addition, the first driver circuits 2*a* attached to the first side 1*a* of the liquid crystal display panel 1 are circuits for generating signals applied to the number of video signal lines running through the first display region 3*a*. In addition, the second driver circuits 2*b* attached to the second side 1*b* of the liquid crystal display panel 1 are circuits for generating signals applied to the number of video signal lines running through the second display region 3*b*.

In addition, the third driver circuits 2*c* attached to the third side 1*c* and the fourth side 1*d* of the liquid crystal display panel 1 are circuits for generating signals applied to the number of scanning signal lines running through the first display region 3*a*. In addition, the fourth driver circuits 2*d* attached to the third side 1*c* and the fourth side 1*d* of the liquid crystal display panel 1 are circuits for generating signals applied to the number of scanning signal lines running through the second display region 3*b*.

That is to say, in the liquid crystal display panel 1 of the present embodiment, signals applied to the video signal lines from the first driver circuits 2*a* and signals applied to the scanning signal lines from the third driver circuits 2*c* control the display in the first display region 3*a*, and signals applied to the video signal lines from the second driver circuits 2*b* and signals applied to the scanning signal lines from the fourth driver circuits 2*d* control the display in the second display region 3*b*.

The first driver circuits 2*a*, the second driver circuits 2*b*, the third driver circuits 2*c* and the fourth driver circuits 2*d* are semiconductor packages, for example COF's or TAB's, where a driver IC in chip form is mounted on a flexible printed wiring board (may be referred to as interposer). Here, the first driver circuits 2*a*, the second driver circuits 2*b*, the third driver circuits 2*c* and the fourth driver circuits 2*d* are not limited to semiconductor packages, as described above, and may be driver IC's in chip form, as those described above, or circuits formed on the TFT substrate used in the liquid crystal display panel 1 together with the scanning signal lines and the like.

In addition, the region occupied by one pixel in one display region 3 corresponds to a region surrounded by two adjacent scanning signal lines and two adjacent video signal lines. An example of the circuit configuration of one pixel is shown in FIG. 1(*b*). That is to say, one pixel has a TFT element 4, a pixel capacitor 5 (may also be referred to as liquid crystal capacitor) and a storing capacitor 6 (may also be referred to as auxiliary capacitor). The pixel capacitor 5 is a capacitor formed of a pixel electrode, a counter electrode and a liquid crystal material in one pixel, and the storing capacitor 6 is a capacitor formed of the above described pixel electrode, a storing capacitor line CL of which the potential is the same as that of the above described counter electrode, and an insulating layer which is different from the above described liquid crystal material. In addition, the gate of the TFT element 4 is connected to one of the two adjacent scanning signal lines GL, the drain is connected to one of the two adjacent video signal lines DL, and the source is connected to the pixel electrode.

In addition, the pixels in the first display region 3*a* in the liquid crystal display panel 1 in the present embodiment are aligned as shown in FIG. 1(*c*), for example. Here, FIG. 1(*c*) shows an example of how twelve pixels are aligned in two rows of six pixels in the vicinity of the center of the first display regions 3*a*.

That is to say, in the first display region 3*a*, pixels of which the source of the TFT element 4 is connected to one of the two adjacent video signal lines DL and pixels of which the source of the TFT element 4 is connected to the other of the two adjacent video signal lines DL alternate in the direction in which the video signal lines DL extend (direction y). In addition, the gate of the TFT element 4 in each pixel is connected to the scanning signal line GL on the signal input terminal side of the video signal line DL connected to the drain of the TFT element 4 instead of the pixel electrode (pixel capacitor 5) connected to the source of the TFT element 4.

In addition, adjacent storing capacitor lines CL with one scanning signal line GL in between are electrically connected to each other through bridge wires BR. In addition, bridge wires BR may be provided for each pixel, as shown in FIG. 1(*c*), or for every several pixels.

In addition, though not shown, the alignment of the pixels in the second display region 3*b* is that shown in FIG. 1(*c*) turned upside-down.

In addition, the pixels in the first display region 3*a* and the pixels in the second display region 3*b* are aligned so that the arrangement of an adjacent pixel in the first display region 3*a* and pixel in the second display region 3*b* with the border line BL in between are as in FIG. 1(*d*), for example. That is to say, the arrangement of the TFT element 4 and the pixel electrode (pixel capacitor 5) in a pixel in the first display region 3*a* and the arrangement of the TFT element 4 and the pixel electrode (pixel capacitor 5) in a pixel in the second display region 3*b* is one of line symmetry with the border line BL as the axis of symmetry.

Here, the pixels in the first display region 3*a* and the pixels in the second display region 3*b* may be aligned so that the arrangement of an adjacent pixel in the first display region 3*a* and pixel in the second display region 3*b* with the border line BL in between are as in FIG. 1(*e*), for example. That is to say, the arrangement of the TFT element 4 and the pixel electrode (pixel capacitor 5) in a pixel in the first display region 3*a* and the arrangement of the TFT element 4 and the pixel electrode (pixel capacitor 5) in a pixel in the second display region 3*b* may be one of point symmetry with the line section on the border line BL which divides the two pixels as the center of symmetry.

Figure 2A:
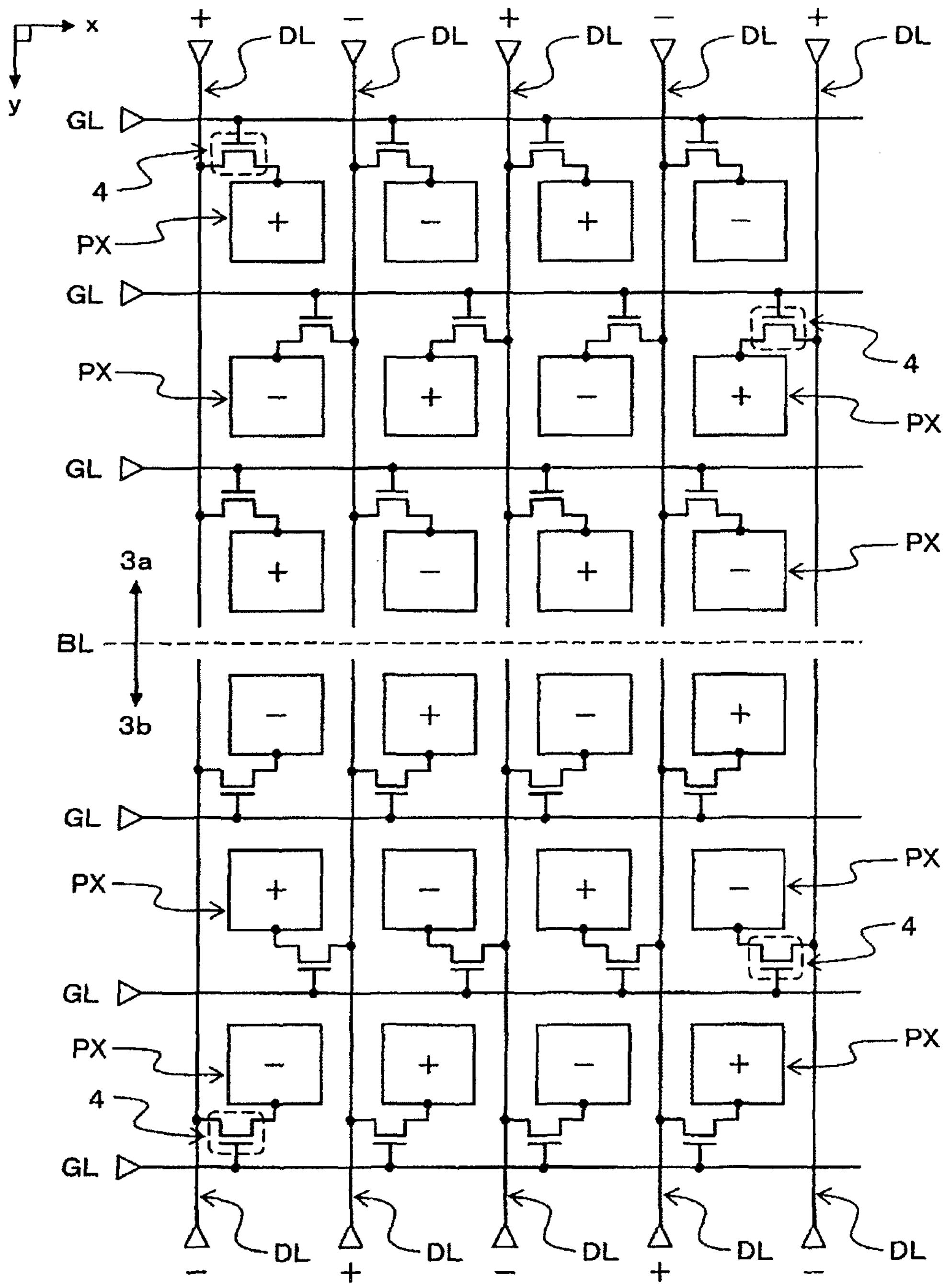
FIG. 2(*a*) is a schematic diagram showing an example of a control method in the case where the respective pixels are aligned as shown in FIGS. 1(*c*) and 1(*d*)
Figure 2B:
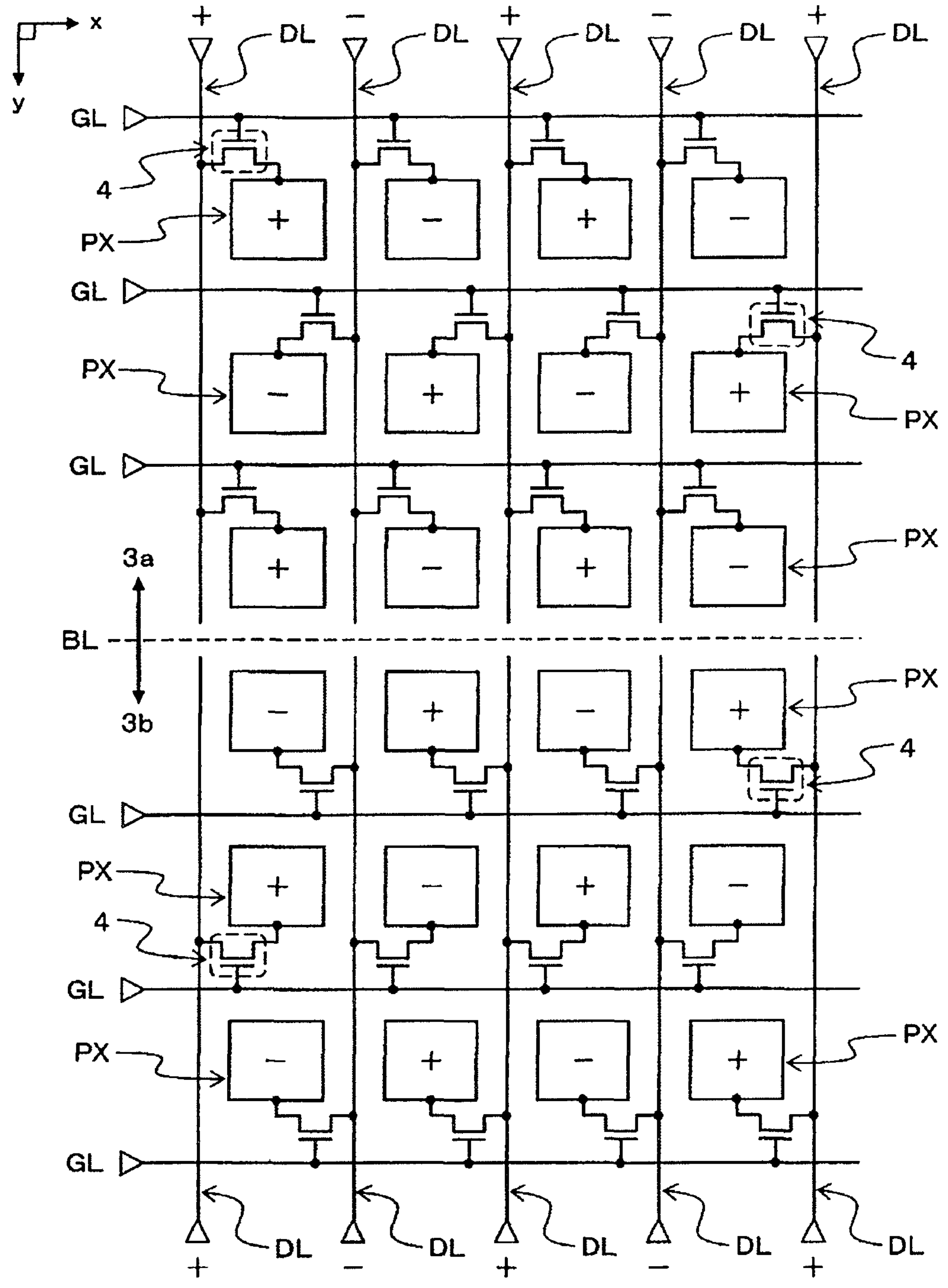
Figure 3A:
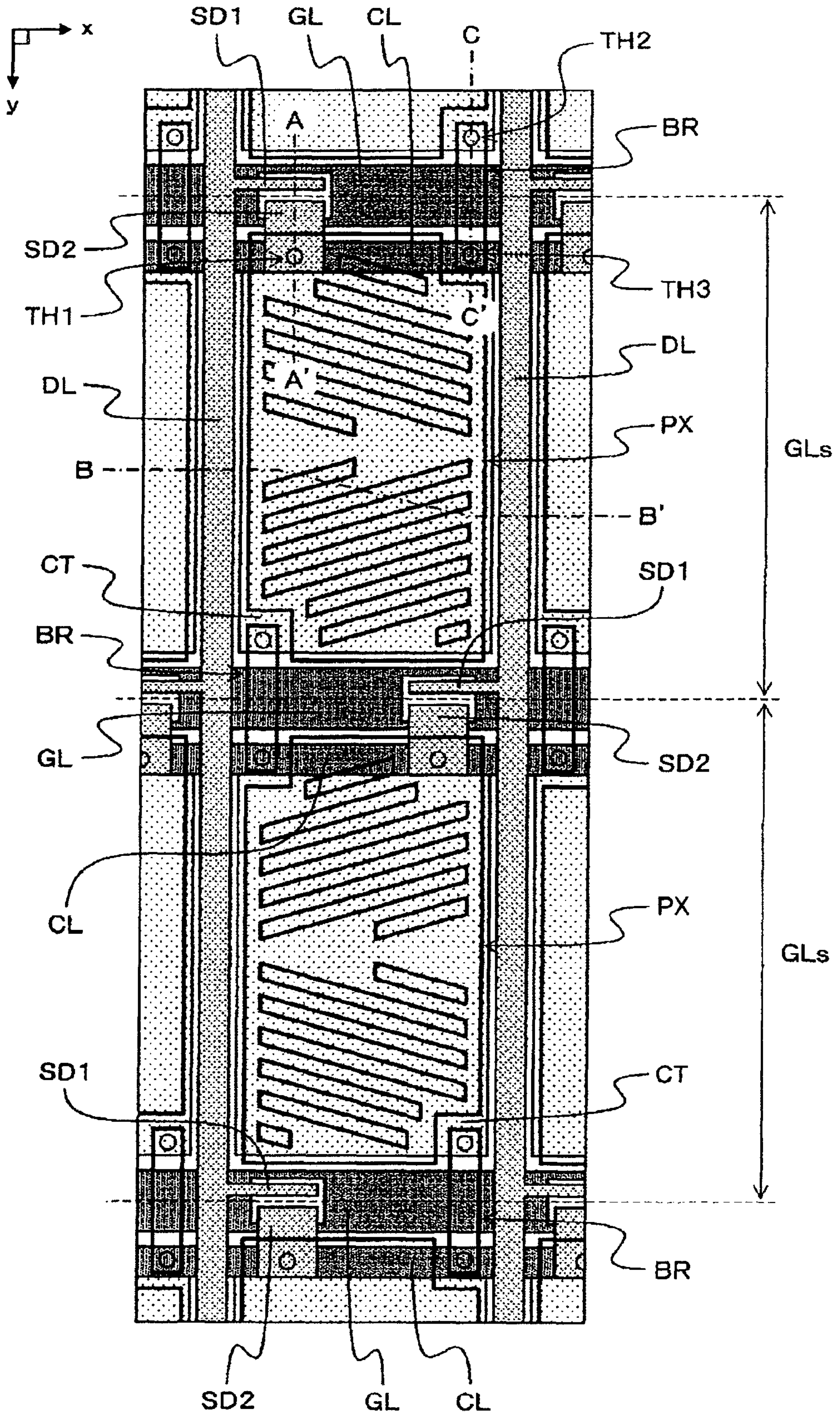
FIG. 3(*a*) is a schematic plan diagram showing an example of the configuration of pixels in the vicinity of the center of the first display region 3*a* on the TFT substrate.
Figure 3B:
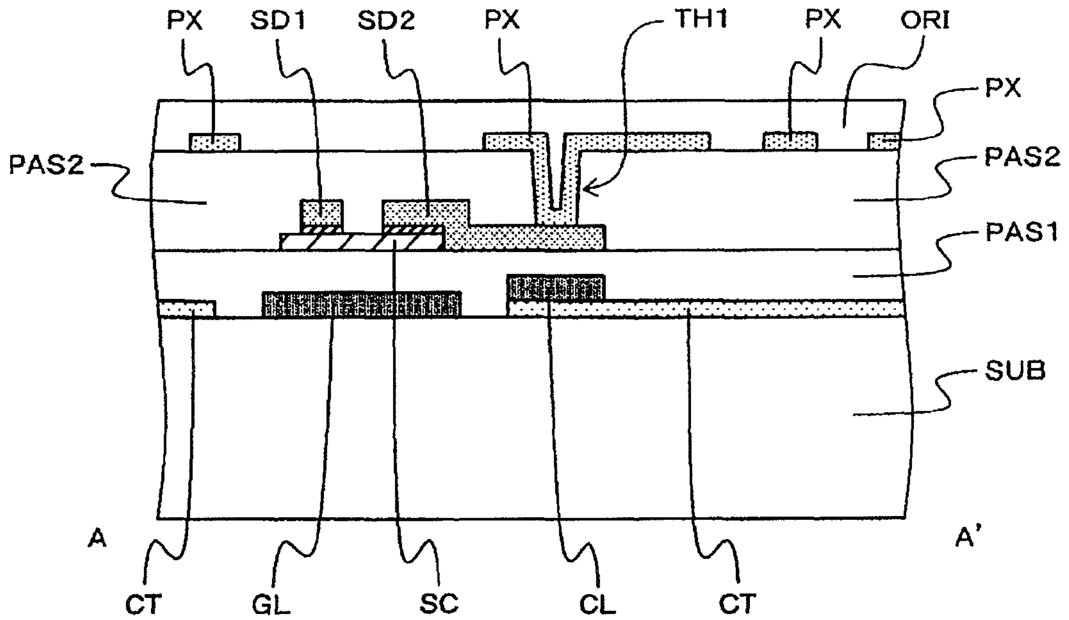
Figure 3C:
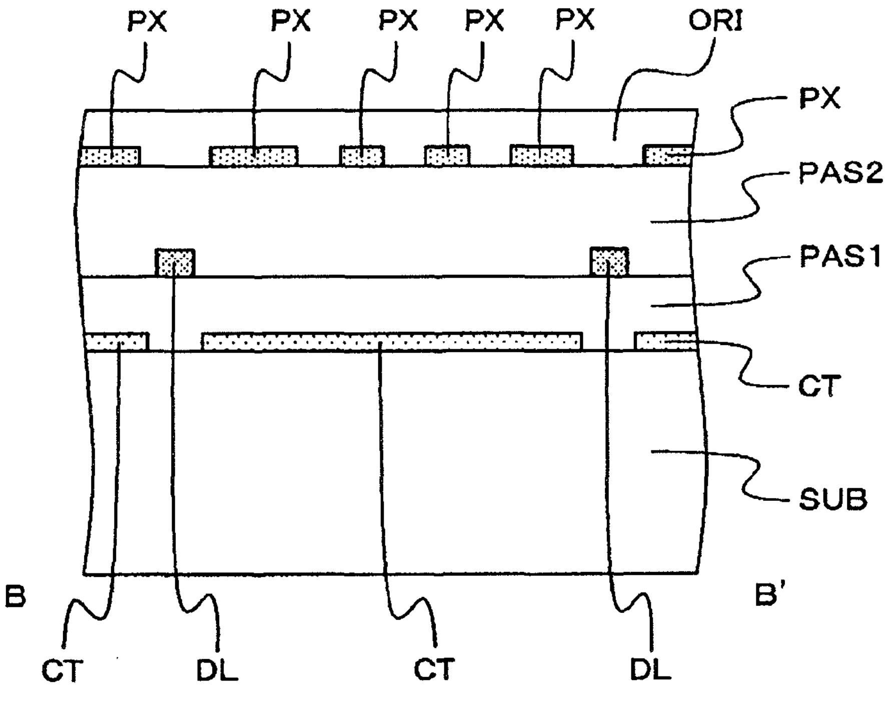
Figure 3D:
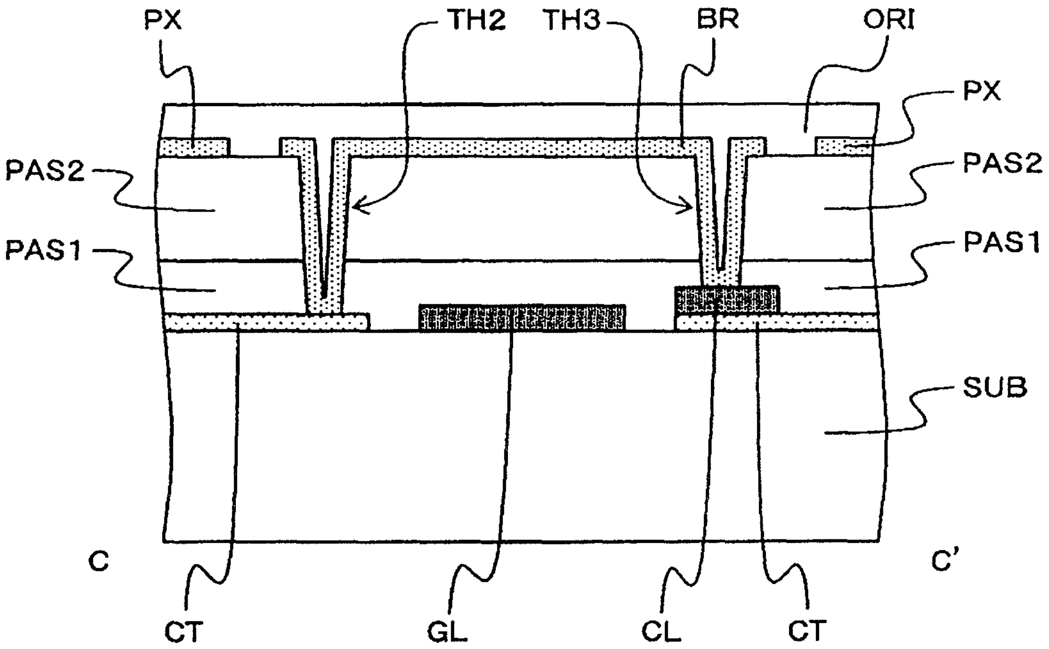
Figure 3E:
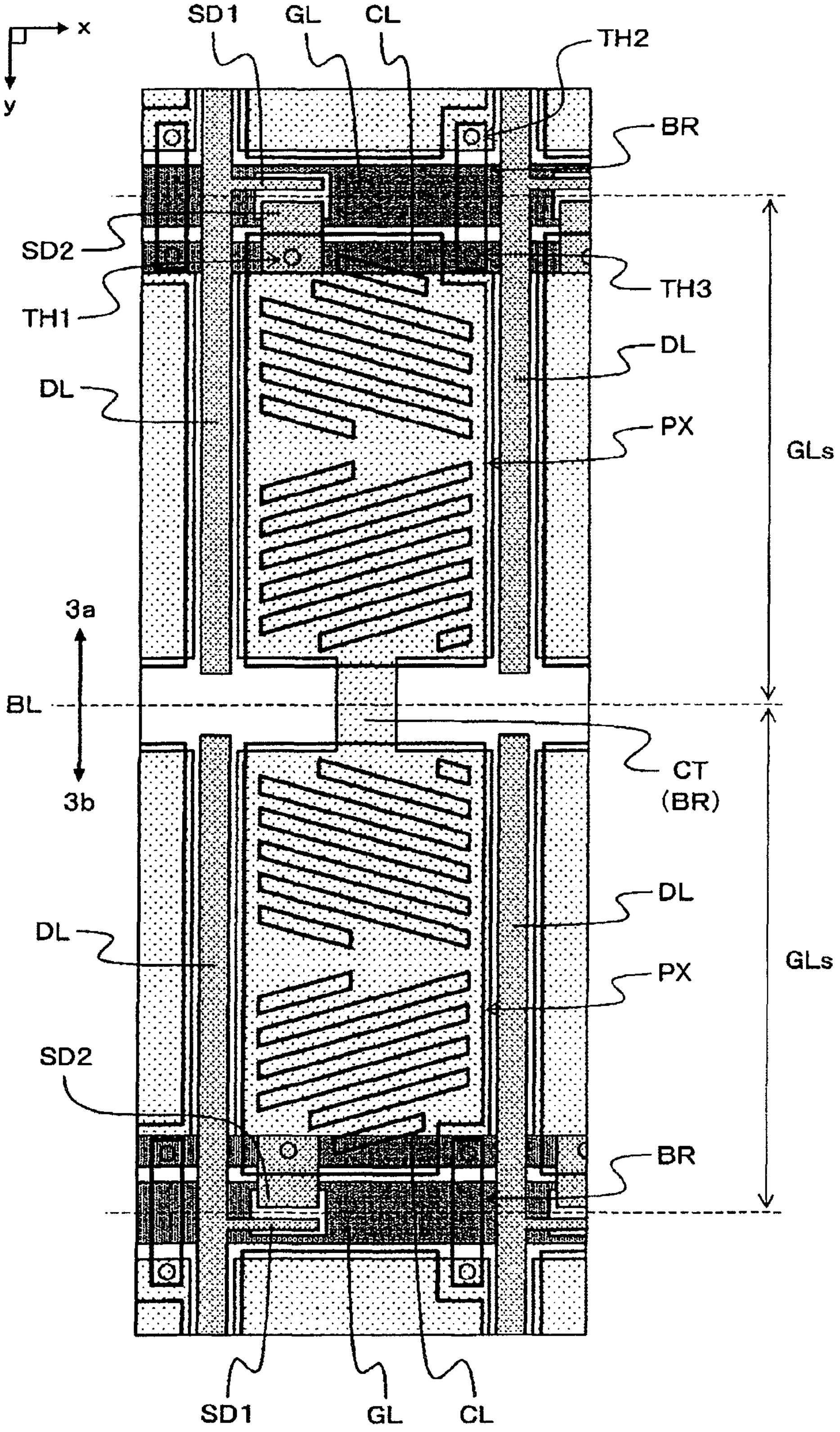

FIGS. 2(*a*) and 2(*b*) are schematic diagrams illustrating the method for driving a liquid crystal display panel in the present embodiment.

FIG. 2(*a*) is a schematic diagram showing an example of the drive method in the case where the arrangement of the pixels is like that shown in FIGS. 1(*c*) and 1(*d*). FIG. 2(*b*) is a schematic diagram showing an example of the drive method in the case where the arrangement of the pixels is like that shown in FIGS. 1(*c*) and 1(*e*).

Here, FIGS. 2(*a*) and 2(*b*) respectively show an arrangement of 24 pixels in total of four rows of six pixels in the border line portion. In addition, only a TFT element and a pixel electrode are shown in each pixel.

In addition, the direction x and the direction y shown in FIGS. 2(*a*) and 2(*b*) are respectively the same as the direction x and the direction y shown in FIG. 1(*a*). In addition, in FIGS. 2(*a*) and 2(*b*), respective triangles at one end of the scanning signal lines and at one end of the video signal lines indicate the direction in which signal input terminals are connected.

In the case where videos and images are displayed on an active matrix type liquid crystal display panel, such as the liquid crystal display panel 1 in the present embodiment, the gradation for the display is provided by switching the display with the positive electrode and the display with the negative electrode for predetermined frames (for example, for one frame). Here, the above described display with the positive electrode is a display in such a state that the potential of the signal stored in a pixel electrode from a video signal line DL (gradation voltage) is higher than the potential of the counter electrode, and the above described display with the negative electrode is a display in such a state that the potential of the signal stored in a pixel electrode from a video signal line DL (gradation voltage) is lower than the potential of the counter electrode.

In addition, in the case where videos and images are displayed on an active matrix type liquid crystal display panel 1, it is desirable for two pixels which are adjacent in the direction in which scanning signal lines GL extend (direction x) to have opposite polarities during one frame period as shown in, for example, FIG. 2(*a*), and for two pixels which are adjacent in the direction in which video signal lines DL extend (direction y) to also have opposite polarities. This display method is generally referred to as dot inversion system.

Here, FIG. 2(*a*) shows an example in the case where adjacent pixels in the first display region 3*a* and pixels in the second display region 3*b* with the border line BL in between are in an arrangement of line symmetry as that shown in FIG. 1(*d*). In addition, in FIG. 2(*a*), + (plus) shown in the pixel electrodes PX of the pixels indicates the positive polarity and – (minus) indicates the negative polarity.

In the case where videos and images are displayed by means of a dot inversion system in this liquid crystal display panel 1 where the arrangement of the pixels is the one as shown in FIGS. 1(*c*) and 1(*d*), signals applied to any adjacent two video signal lines DL running through the first display region 3*a* may have opposite polarities. At this time, the signals applied to one video signal line DL may always have the same polarity during one frame period.

Likewise, signals applied to any two adjacent video signal lines DL running through the second display region 3*b* may have opposite polarities. In this case as well, signals applied to one video signal line DL may always have the same polarity during one frame period.

Here, in the case of the arrangement shown in FIG. 2(*a*), the video signal line DL to which the drains of the TFT element 4 of pixels in the first display region 3*a* and the video signal line DL to which the drains of the TFT element 4 of pixels in the second display region 3*b* face each other with the border line BL in between. Therefore, in order for two adjacent pixels with the border line BL in between to have opposite polarities, signals having opposite polarities may be applied to the video signal line DL in the first display region 3*a* and the video signal line DL in the second display region 3*b* which face each other with the border line BL in between as shown in FIG. 2(*a*).

In addition, the polarities of the pixels shown in FIG. 2(*a*) are an example of polarities when one frame is displayed. Therefore, the polarities of the pixels are reversed, that is to say, the pixels of a positive polarity become of a negative polarity and the pixels of a negative polarity become of a positive polarity when the next frame is displayed, for example.

In addition, it is possible to display videos and images by means of a dot inversion system on the liquid crystal display panel 1 where the arrangement of the pixels is the one as shown in FIGS. 1(*c*) and 1(*e*), and in this case, the polarities of the respective pixels and the polarities of the signals applied to the respective video signal lines DL are shown in FIG. 2(*b*), for example. That is to say, in order for adjacent pixels in the first display region 3*a* and pixels in the second display region 3*b* with the border line BL in between to have opposite polarities, signals of the same polarity are applied to the video signal line DL in the first display region 3*a* and the video signal line in the second display region 3*b* which face each other with the border line BL in between as shown in FIG. 2(*b*).

At this time, signals applied to a number of video signal lines DL running through the first display region 3*a* and signals applied to the video signal line DL may always have the same polarity during one frame period, and any two adjacent video signal lines DL have opposite polarities. Likewise, signals applied to a number of video signal lines DL running through the second display region 3*b* and signals applied to the video signal line DL may always have the same polarity during one frame period, and any two adjacent video signal lines DL have opposite polarities.

As described above, in the liquid crystal display panel 1 in the present embodiment, signals applied to the respective video signal lines DL are generated in the first driver circuits 2*a* and in the second driver circuits 2*b* in accordance with the same method as the column inversion system while videos and images are displayed in the display region in a dot inversion system. Therefore, the load of the first driver circuits 2*a* and the second driver circuits 2*b* is reduced when videos and images are displayed in a dot inversion system, and thus, breakdowns and malfunctions due to heat can be reduced. In addition, videos and images can be displayed in a dot inversion system even when signals generated in the first driver circuits 2*a* and the second driver circuits 2*b* in accordance with the same method as the column inversion system are applied to the respective video signal line DL, and therefore, longitudinal smear, which becomes a problem with the display in a column inversion system, can be prevented, and image quality can be prevented from lowering due to the longitudinal smear.

In addition, in the case where one display region 3 is divided into two regions: a top region and a bottom region, as in the liquid crystal display panel 1 in the present embodiment, the display in the first display region 3*a* and the display in the second display region 3*b* can be aligned side-by-side when one frame of a video or an image is displayed in one display region 3, for example. Therefore, the time required for displaying one frame of a video or an image can be shortened, and thus, it becomes easy to deal with increases in the speed (for example, 240 Hz drive).

FIGS. 3(*a*) to 3(*e*) are schematic diagrams showing an example of the configuration of pixels on the TFT substrate in the liquid crystal display panel in the present embodiment.

FIG. 3(*a*) is a schematic plan diagram showing an example of the configuration of pixels in the vicinity of the center of the first display region 3*a* on the TFT substrate. FIG. 3(*b*) is a schematic cross sectional diagram along line A-A' in FIG. 3(*a*) and shows an example of the configuration of the TFT substrate. FIG. 3(*c*) is a schematic cross sectional diagram along line B-B' in FIG. 3(*a*) and shows an example of the configuration of the TFT substrate. FIG. 3(*d*) is a schematic cross sectional diagram along line C-C' in FIG. 3(*a*) and shows an example of the configuration of the TFT substrate. FIG. 3(*e*) is a schematic plan diagram showing an example of the configuration of two adjacent pixels with the border line in between on the TFT substrate.

Here, the direction x and the direction y shown in FIGS. 3(*a*) and 3(*e*) are respectively the same as the direction x and the direction y shown in FIG. 1(*a*).

As described above, the liquid crystal display panel 1 in the present embodiment has a circuit configuration as shown in FIGS. 1(*c*) and 1(*d*) or a circuit configuration as shown in FIGS. 1(*c*) and 1(*e*). Next, the actual configuration of the liquid crystal display panel 1 having the above described circuit configuration is briefly described. Here, in the following description, pixel electrodes and counter electrodes are provided on the TFT substrate in the liquid crystal display panel 1, and a liquid crystal display panel in a lateral electrical field drive system where pixel electrodes and counter electrodes are layered on top of each other with an insulating layer in between is cited as an example.

In the case where the present invention is applied to the above described liquid crystal display panel 1 in a lateral electrical field drive system, pixels in the vicinity of the center of the first display region 3*a* on the TFT substrate have a configuration as shown in FIGS. 3(*a*) to 3(*d*), for example. First, counter electrodes CT, scanning signal lines GL and storing capacitor lines CL are provided on the surface of an insulating substrate SUB, such as a glass substrate. Here, in the example shown in FIGS. 3(*a*) to 3(*d*), a transparent conductive film, such as ITO, is formed and etched so that counter electrodes CT are formed on the surface of the insulating substrate SUB, and after that, a conductive film, such as aluminum, is formed and etched so that the scanning signal lines GL and the storing capacitor lines CL are formed. However, the invention is not limited to this, and an ITO film and an aluminum film may be formed in sequence, and after that, the aluminum film may be etched so that scanning signal lines GL and storing capacitor lines CL are formed, and subsequently, the ITO film may be etched so that counter electrodes CT are formed, for example. Furthermore, an aluminum film may be formed on the surface of the insulating substrate SUB and etched so that scanning signal lines GL and storing capacitor lines CL are formed, and after that, an ITO film may be subsequently formed and etched so that counter electrodes CT are formed, for example.

Semiconductor layers SC for TFT elements 4, video signal lines DL (including drain electrodes SD1 of TFT elements 4) and source electrodes SD2 of TFT elements 4 are provided on top of the counter electrodes, the scanning signal lines GL and the storing capacitor lines CL with a first insulating layer PAS1 in between. The first insulating layer PAS1 is an insulating layer which functions as the gate insulating film of the TFT elements 4, and for example, formed of a silicon oxide film or a silicon nitride film. Here, in the example shown in FIGS. 3(*b*) to 3(*d*), the first insulating layer PAS1 is formed in such a manner that the surface on which the semiconductor layers SC and the video signal lines DL are formed becomes flat. The invention is not limited to this, however, and the first insulating layer PAS1 may be formed in such a manner that the thickness in any location on the insulating substrate SUB becomes approximately uniform, for example. That is to say, the first insulating layer PAS1 may have steps on the surface on which semiconductor layers SC and video signal lines DL are formed.

In addition, the semiconductor layers SC are formed of an active layer in which channels are formed, a drain diffusion layer which intervenes between the active layer and a drain electrode SD1, and a source diffusion layer which intervenes between the active layer and a source electrode SD2. In addition, the drain electrodes SD1 are formed so as to be integrated with the video signal lines DL. In addition, the drain electrodes SD1 and the source electrodes SD2 partially extend over the semiconductor layers SC.

When the semiconductor layers SC, the video signal lines DL (including the drain electrodes SD1) and the source electrodes SD2 are formed, a first semiconductor film to be used as the above described active layers and a second semiconductor film to be used as the above described drain diffusion layers and the above described source diffusion layers are first formed on the entire surface of the first insulating layer PAS1 and are etched so that active layers in island form are formed, for example. At this time, the above described second semiconductor film on top of the above described active layers is not yet separated into the above described drain diffusion layers and the above described source diffusion layers. Next, a conductive film, such as of aluminum, is formed and etched so that video signal lines DL (including drain electrodes SD1) and source electrodes SD2 are formed. After that, the drain electrodes SD1 and the source electrodes SD2 are used as a mask so that the above described second semiconductor layer is etched so as to be separated into the above described drain diffusion layers and the above described source diffusion layers.

Pixel electrodes PX and bridge wires BR are provided on top of the semiconductor layers SC, the video signal lines DL (including the drain electrodes SD1) and the source electrodes SD2 with a second insulating layer PAS2 in between. The second insulating layer PAS2 is formed of an inorganic insulating film, such as a silicon nitride film or the like, or an organic insulating film. At this time, the second insulating layer PAS2 may be made of one type of insulating film or two or more types of insulating films may be layered. Here, in the example shown in FIGS. 3(*b*) to 3(*d*), the second insulating layer PAS2 is formed in such a manner that the surface on which the pixel electrodes PX and the bridge wires BR are formed becomes flat. The invention is not limited to this, however, and the second insulating layer PAS2 may be formed in such a manner that the thickness in any location of the insulating substrate SUB becomes approximately uniform, for example. That is to say, the second insulating layer PAS2 may have steps on the surface on which the pixel electrodes PX and the bridge wires are formed.

In addition, when the second insulating layer PAS is formed, through holes TH1, TH2 and TH3 are created above the source electrodes SD2, in the corner portions of the facing electrodes CT and above the storing capacitor lines CL, for example.

In addition, the pixel electrodes PX and the bridge wires BR are formed by forming and etching a transparent conductive film, such as of ITO. At this time, the pixel electrodes PX are connected to the source electrodes SD2 of TFT elements 4 via through holes TH1. In addition, the pixel electrodes PX have a so-called comb form in a plane, and a number of slits are created in the portions which overlap the counter electrodes CT as viewed in a plane.

In addition, the bridge wires BR are provided so as to cross the scanning signal lines GL, connected to one of two adjacent counter electrodes CT with a scanning signal line GL in between via a through hole TH2, and electrically connected to the other of the counter electrodes CT (storing capacitor line CL) via a through hole TH3.

An orientation film ORI is provided on top of the pixel electrodes PX and the bridge wires BR.

At this time, the arrangement of two adjacent pixels in the direction in which the video signal lines DL extend in the first display region 3*a* (direction y) is that which is turned sideways, for example, in a plane layout. Here, in the example shown in FIG. 3(*a*), the arrangement of the slits in the pixel electrodes PX is also that which is turned sideways. The invention is not limited to this, however, and the slits may be directed in the same direction.

Here, though it is natural, the intervals GLs between the scanning signal lines GL are all the same.

In addition, though not shown, the arrangement of pixels in the vicinity of the center of the second display region 3*b* is that shown in FIG. 3(*a*) turned upside-down, for example, in a plane layout.

Meanwhile, the arrangement of adjacent pixels in the first display region 3*a* and pixels in the second display region 3*b* with the border line BL in between is shown, for example, in a plane layout in FIG. 3(*e*). Here, FIG. 3(*e*) shows a plane layout in the case where the arrangement of two pixels is the one in line symmetry as shown in FIG. 1(*d*).

At this time, though it is natural, the distance between the scanning signal line GL that is the closest to the border line BL in the first display region 3*a* and the border line BL and the distance between the scanning signal line GL that is the closest to the border line BL in the second display region 3*b* and the border line BL are the same as the intervals GLs between two adjacent scanning signal lines GL in the first display region 3*a*.

In addition, scanning signal lines GL and storing capacitor lines CL are not provided in the portion through which the border line BL runs, and therefore, it is possible for the counter electrodes CT of pixels in the first display region 3*a* and the counter electrodes CT of pixels in the second display region 3*b* to be directly connected, that is to say, to be integrally formed, and thus, connection using bridge wires BR is not necessary. At this time, it is desirable for the portions for connecting the counter electrodes CT of pixels in the first display region 3*a* and the counter electrodes CT of pixels in the second display region 3*b* to be thinner than the portions which function as the counter electrodes CT, for example, as shown in FIG. 3(*e*). In this configuration, the wire resistance in the connection portions between the counter electrodes CT of pixels in the first display region 3*a* and the counter electrodes CT of pixels in the second display region 3*b* can be made approximately the same as the wire resistance in the connection portions between the counter electrodes CT via bridge wires BR, and thus, the potential of the counter electrodes CT in the pixels can be stabilized.

Here, in the present embodiment, the configuration shown in FIGS. 3(*a*) to 3(*e*) is cited as an example of the configuration of the TFT substrate in the liquid crystal display panel to which the present invention is applied. The invention is not limited to this, however, and the present invention can be applied to TFT substrates having various configurations.

Figure 4A:
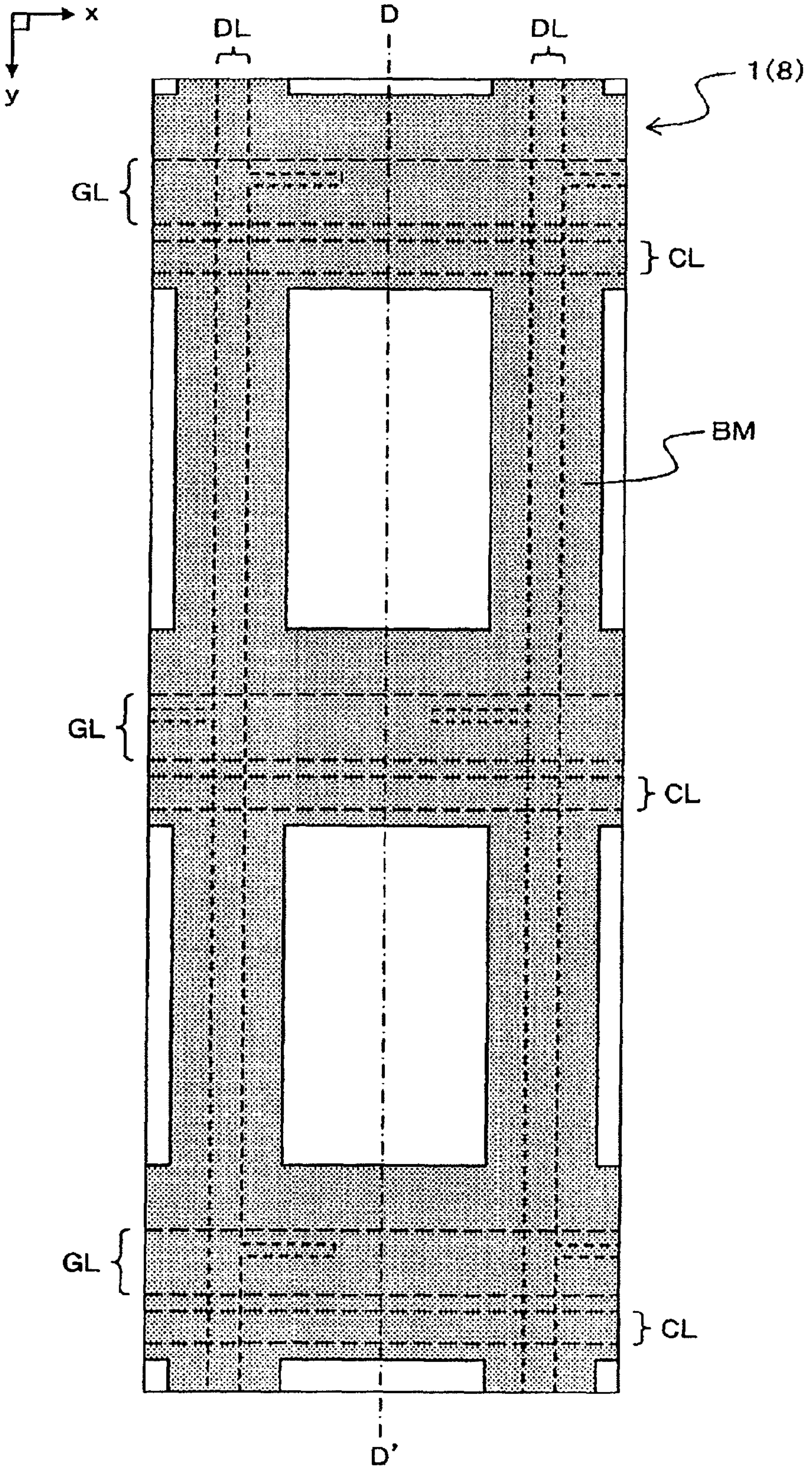
FIG. 4(*a*) is a schematic plan diagram showing an example of the configuration of pixels in the vicinity of the center of the first display region 3*a* in the liquid crystal display panel as viewed from the facing substrate side.
Figure 4B:
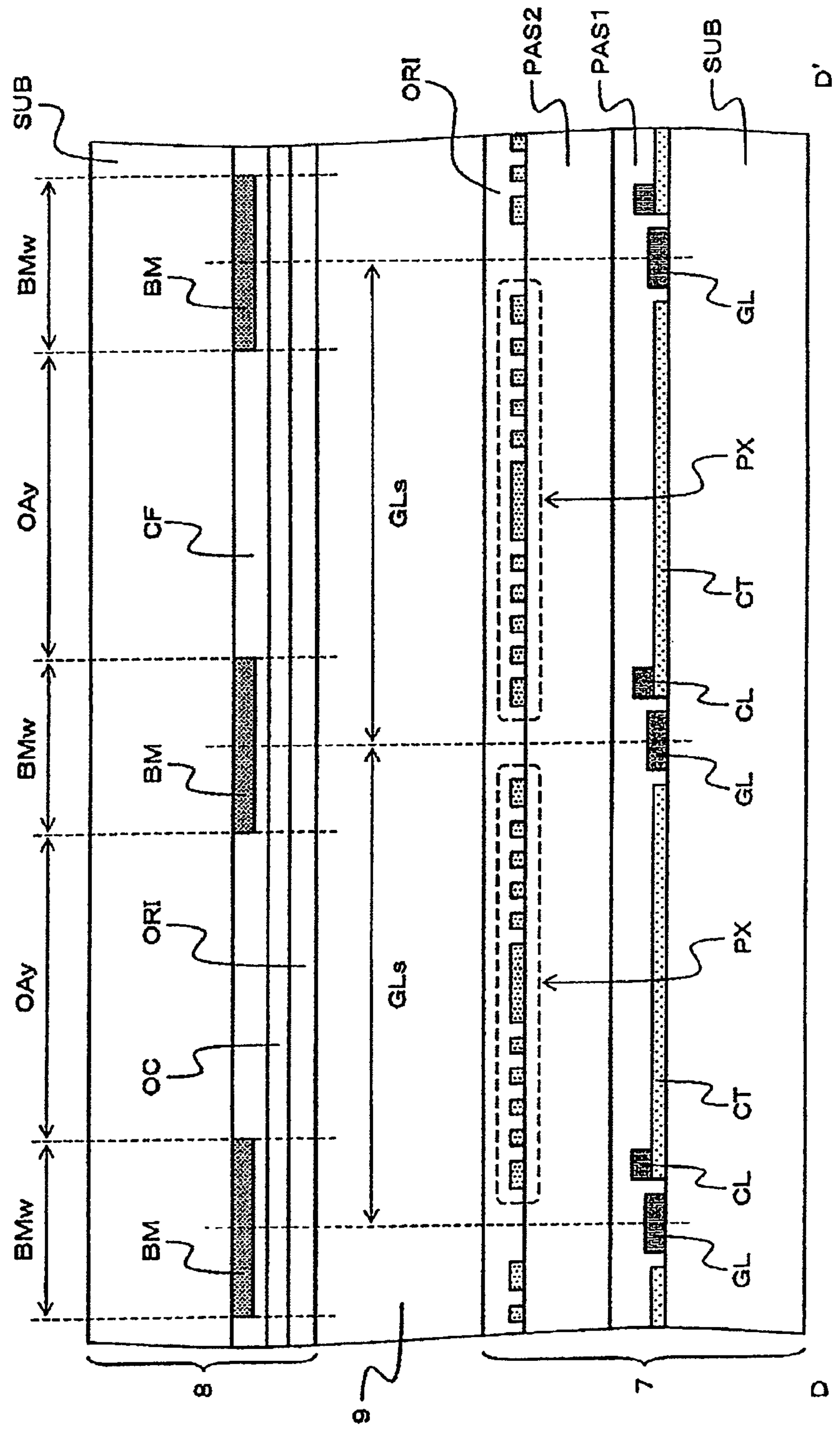

FIGS. 4(*a*), 4(*b*), 5(*a*) and 5(*b*) are schematic diagrams illustrating an example with other working effects of the liquid crystal display panel in the present embodiment.

FIG. 4(*a*) is a schematic plan diagram showing an example of the configuration of pixels in the vicinity of the center of the first display region 3*a* in the liquid crystal display panel as viewed from the facing substrate side. FIG. 4(*b*) is a schematic cross sectional diagram along line D-D' in FIG. 4(*a*) and shows an example of the configuration of the liquid crystal display panel.

Figure 5A:
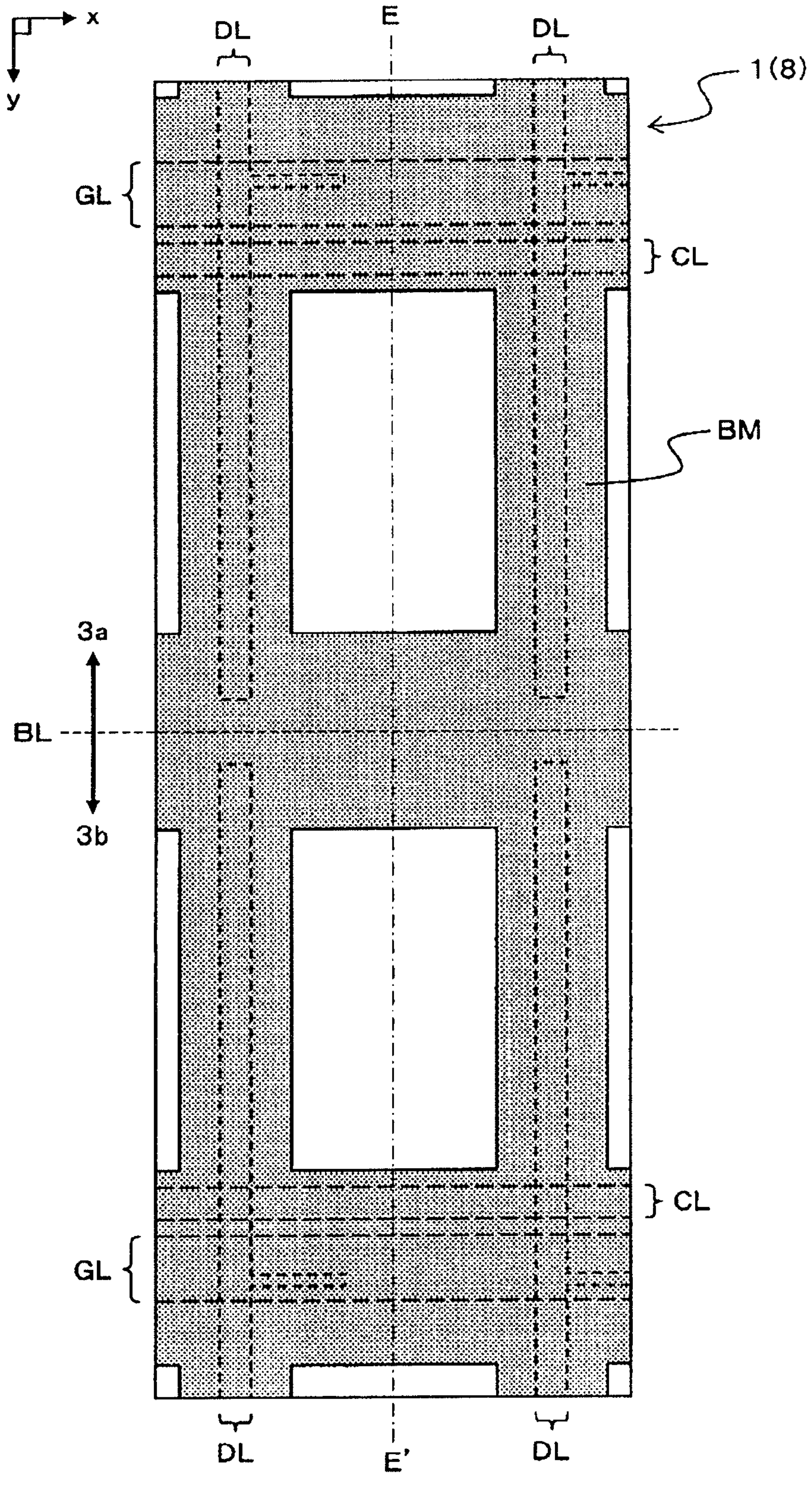
FIG. 5(*a*) is a schematic plan diagram showing an example of the configuration of two adjacent pixels with the border line in between in the liquid crystal display panel as viewed from the facing substrate side.
Figure 5B:
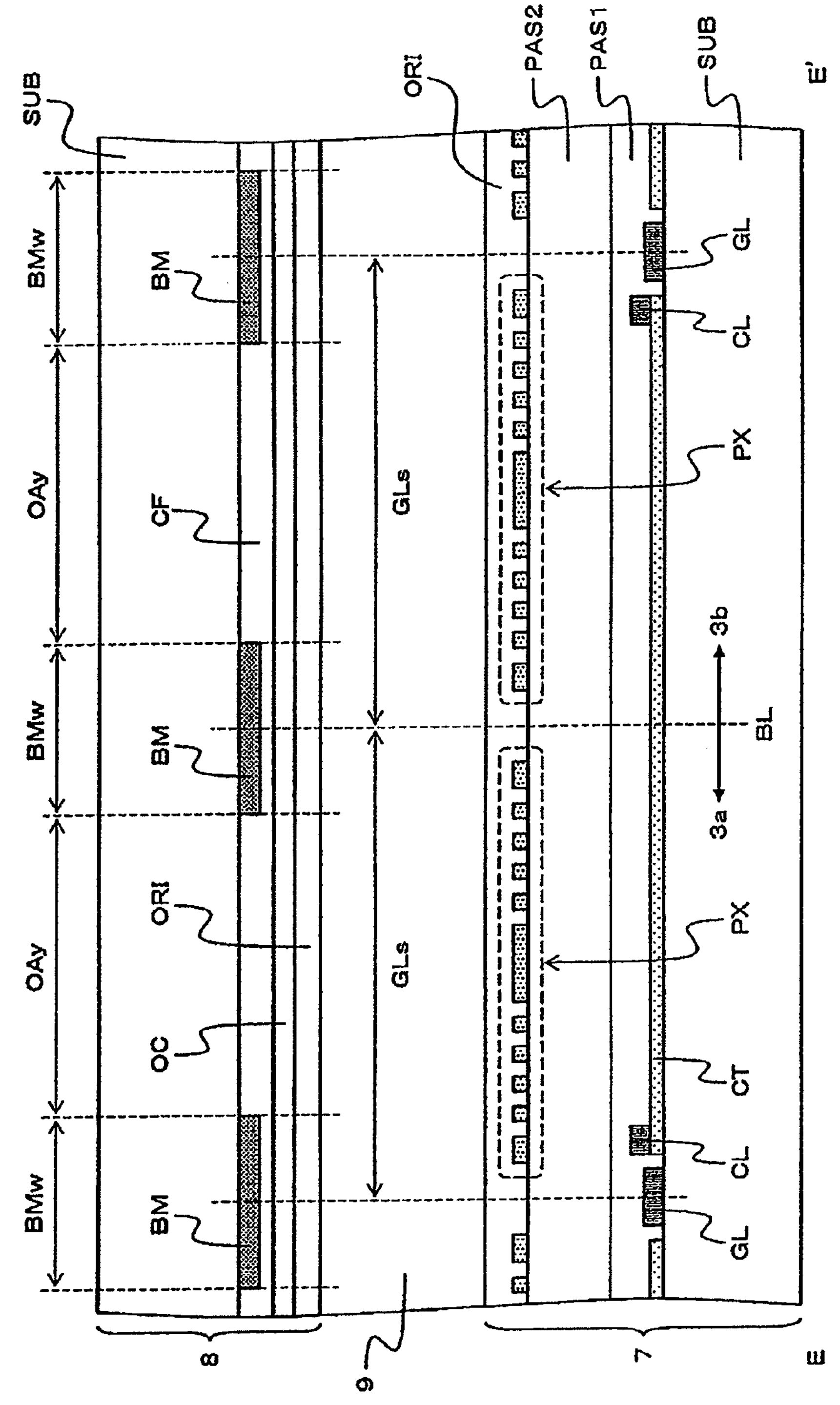

FIG. 5(*a*) is a schematic plan diagram showing an example of the configuration of adjacent two pixels with the border line in between in the liquid crystal display panel as viewed from the facing substrate side. FIG. 5(*b*) is a schematic cross sectional diagram along line E-E' in FIG. 5(*a*) and shows an example of the configuration of the liquid crystal display panel.

Here, FIGS. 4(*a*), 4(*b*), 5(*a*) and 5(*b*) are plan diagrams and cross sectional diagrams which show an example of the configuration of a liquid crystal display panel where a TFT substrate having the same configuration as shown in FIGS. 3(*a*) to 3(*e*) is used. In addition, FIG. 4(*a*) is a plan diagram showing the same region as shown in FIG. 3(*a*) as viewed from the facing substrate side, and FIG. 5(*a*) is a plan diagram showing the same region as shown in FIG. 3(*e*) as viewed from the facing substrate side.

In addition, in FIGS. 4(*b*) and 5(*b*), the polarizing plate and the phase difference plate are omitted.

In addition, the direction x and the direction y shown in FIGS. 4(*a*) and 5(*a*) are respectively the same as the direction x and the direction y shown in FIG. 1(*a*).

The liquid crystal display panel 1 is a display panel where a liquid crystal material 9 is sealed between a TFT substrate 7 and a facing substrate 8, and the TFT substrate 7 has a configuration which is shown, for example, in FIGS. 3(*a*) to 3(*e*). Here, in the facing substrate 8, a light blocking film (black matrix) BM, a color filter CF, an overcoat layer OC, an orientation film ORI and the like are provided on the surface (surface facing the TFT substrate 7) of an insulating substrate SUB, for example, a glass substrate, as shown in FIGS. 4(*a*) and 4(*b*).

The light blocking film BM is formed of a conductive film or an insulating film having excellent light blocking properties and is generally in net form in a plane in the display region 3 which extends in locations facing the scanning signal lines GL and locations facing the video signal lines DL. Here, the portions of the light blocking film BM which extend to locations so as to face the scanning signal lines GL are aligned with the same intervals GLs as the scanning signal lines GL, and the widths BMw in the direction in which the video signal lines DL extend (direction y) are approximately the same. That is to say, the length OAy of the opening region (region through which light transmits) in the direction y is approximately the same for every pixel.

In the case of the liquid crystal display panel 1 in the present embodiment, however, scanning signal lines GL or TFT elements 4 are not provided between adjacent pixels in the first display region 3*a* and pixels in the second display region 3*b* with the border line BL in between (that is to say, along the border line BL), for example, as shown in FIG. 3(*e*). In the case of this liquid crystal display panel 1, it is not generally necessary for the light blocking film BM to extend to the border line BL.

When the light blocking film BM does not extend to the border line BL, however, the opening regions of adjacent pixels in the first display region 3*a* and pixels in the second display region 3*b* with the border line BL in between form one continuous opening region, and thus, the ratio of opening of two pixels becomes greater than the ratio of opening of other pixels. Therefore, the seam between the first display region 3*a* and the second display region 3*b* becomes conspicuous due to the difference in the brightness or the like in the border portion, for example, and there is a possibility that the image quality may lower.

Therefore, in the liquid crystal display panel in the present embodiment, the light blocking film BM is formed so as to extend to the border line BL, for example, as shown in FIGS. 5(*a*) and 5(*b*). Here, in the portion where the light blocking film BM overlaps the border line BL, the width in the direction in which the video signal lines DL extend (direction y) becomes approximately equal to the length BMw in the direction y of the portions which extend to such locations as to face the scanning signal lines GL. In addition, in the portion where the light blocking film BM overlaps the border line BL, adjacent pixels in the first display region 3*a* and pixels in the second display region 3*b* with the border line BL in between have opening regions of which the length in the direction y is equal to the length OAy in the direction y of the opening regions of other pixels.

In this configuration, the ratio of opening of two adjacent pixels with the border line BL in between becomes approximately equal to the ratio of opening of other pixels, and the picture quality can be prevented from lowering due to the difference in the brightness and the like.

In addition, the configuration of the border portion between the first display region 3*a* and the second display region 3*b* on the TFT substrate 7 in the liquid crystal display panel 1 in the present embodiment is shown in FIG. 3(*e*), for example, and scanning signal lines GL, storing capacitor lines CL, TFT elements 4 or the like are not provided in the periphery of the border line BL. Therefore, it is easy to make the length in the direction y of the portion of the light blocking film BM which overlaps the border line BL the same as the length BMw of the portions facing the scanning signal lines GL.

As described above, in the liquid crystal display panel in the present embodiment, the load of the driver circuits for generating signals to be applied to video signal lines can be reduced when videos and images are displayed in a dot inversion system, for example, and thus, breakdowns and malfunctions due to heat can be reduced. In addition, videos and images are displayed in a dot inversion system, and thus, longitudinal smear and flickering can be prevented, and the image quality can be prevented from lowering due to the longitudinal smear.

In addition, in the liquid crystal display panel in the present embodiment, one display region is divided into two regions: a top region and a bottom region, and the border portion (seam) between the first display region and the second display region can be made inconspicuous when videos and images are displayed side-by-side in the respective display regions.

Though the present invention is concretely described above on the basis of the embodiment, the present invention is not limited to the above described embodiment and can, of course, be modified in various manners as long as the gist of the invention is not deviated from.

In the above described embodiment, for example, a liquid crystal display panel having a TFT substrate having a configuration as shown in FIGS. 3(*a*) to 3(*e*) is cited as an example of a liquid crystal display panel to which the present invention is applied. However, the invention is not limited to this and can, of course, be applied to liquid crystal display panels having other configurations. That is to say, the present invention can be applied to a liquid crystal display panel where pixel electrodes and counter electrodes are provided on the TFT substrate side and are aligned in the same plane on the insulating layer, for example. In addition, the present invention can also be applied to a liquid crystal display panel where pixel electrodes are provided on the TFT substrate side and counter electrodes are provided on the facing substrate side.

In addition, in the above described embodiment, a liquid crystal display panel is cited as an example. However, the present invention is not limited to a liquid crystal display panel and can be applied to other display panels for displaying videos and images in the same configuration and principles as in liquid crystal display panels.

The invention claimed is:

1. A liquid crystal display device comprising:

a liquid crystal display panel including a liquid crystal material sealed between a first substrate and a second substrate, wherein the first substrate has a plurality of scanning signal lines, a plurality of video signal lines, a plurality of TFT elements, a plurality of counter electrodes and a plurality of pixel electrodes, the liquid crystal display panel includes a first display region and a second display region along a border line in a direction in which the scanning signal line extend, the first display region includes a plurality of pixels arranged between two adjacent video signal lines extending in a column direction in the first display region and a plurality of pixels arranged between two adjacent scanning signal lines extending in a row direction in the first display region, each pixel having a single TFT element and a single pixel electrode, the second display region includes a plurality of pixels arranged between two adjacent video signal lines extending in a column direction in the second display region and a plurality of pixels arranged between two adjacent scanning signal lines extending in a row direction in the second display region, each pixel having a single TFT element and a single pixel electrode, a video signal line connected to sources or drains of the TFT elements of pixels of the first display region and a video signal line connected to sources or drains of the TFT elements of pixels of the second display region are electrically isolated from each other, the plurality of pixels arranged between the two adjacent video signal lines extending in the column direction in the first display region alternately include a pixel having a single TFT element with a source or a drain connected to one of the two adjacent video signal lines and a pixel having the single TFT element with a source or drain connected to another of the two adjacent video signal lines, the plurality of pixels arranged between the two adjacent video signal lines extending in the column direction in the second display region alternately include a pixel having the single TFT element with a source or a drain connected to one of the two adjacent video signal lines and a pixel having the single TFT element with a source or a drain connected to an other of the two adjacent video signal lines, gates of all of TFT elements in the plurality of pixels arranged between the two adjacent scanning signal lines extending in the row direction in the first display region are connected to only one of the two adjacent scanning signal lines, gates of all of TFT elements in the plurality of pixels arranged between the two adjacent scanning signal lines extending in the row direction in the second display region are connected only to one of the two adjacent scanning signal lines, the counter electrodes in adjacent pixels of the column direction in the first display region are electrically connected with a bridge wire, the counter electrodes in adjacent pixels of the column direction in the second display region are electrically connected with a bridge wire, the bridge wire is formed on a layer different from a layer on which the counter electrodes are formed, the counter electrodes in adjacent pixels in the first display region and the counter electrodes in adjacent pixels in the second display region with the border line in between are connected with only a connection portion formed on a same layer as the layer on which the counter electrodes are formed, and the connection portion of the counter electrode of adjacent pixels with the border line in between is thinner than a width of each of the counter electrodes of the adjacent pixels.

2. A liquid crystal display device according to claim 1, wherein an arrangement of the single TFT element and the single pixel electrode in a pixel in the first display region and an arrangement of the single TFT element and the single pixel electrode in a pixel in the second display region are line symmetric with each other with the border line as an axis of symmetry.

3. The liquid crystal display device according to claim 2, wherein signals of the same polarity are always applied to a plurality of video signal lines running through the first display region and a plurality of video signal lines running through the second display region during one frame period, signals of opposite polarities are applied to any two adjacent video signal lines in the same display region, in terms of signals applied to a plurality of video signal lines running through the first display region and a plurality of video signal lines running through the second display region during one frame period, and signals of opposite polarities are applied to the two facing video signals having the border line in between.

4. The liquid crystal display device according to claim 2, wherein the gates of the TFT elements of pixels of the first display region and the gates of the TFT elements of pixels of the second display region are respectively connected to scan signal lines located on the signal input terminal side of the video signal lines to which the sources or drains of the TFT elements are connected relative to the pixel electrodes of the pixels.

5. The liquid crystal display device according to claim 4, wherein the second substrate has a light blocking film in net form which extends to such locations as to face the plurality of scan signal lines and the plurality of video signal lines on the first substrate and locations through which the border line runs, and a size of a portion of the light blocking film extending to the location through which the border line runs in the direction in which the video signal lines extend is approximately the same as a size of a portion extending to such locations as to face the scanning lines in the direction in which the video signal lines extend.

6. A liquid crystal display device according to claim 1, wherein an arrangement of the single TFT element and the single pixel electrode in a pixel in the first display region and an arrangement of the single TFT element and the single pixel electrode in a pixel in the second display region are point symmetric with each other or with a center of a line section of the border line as a center of symmetry.

7. The liquid crystal display device according to claim 6, wherein signals of the same polarity are always applied to a plurality of video signal lines running through the first display region and a plurality of video signal lines running through the second display region during one frame period, signals of opposite polarities are applied to any two adjacent video signal lines in the same display region, in terms of signals applied to a plurality of video signal lines running through the first display region and a plurality of video signal lines running through the second display region during one frame period, and signals of the same polarity are applied to the two facing video signals having the border line in between.

8. The liquid crystal display device according to claim 6, wherein the gates of the TFT elements of the pixels of the first display region and the gates of the TFT elements of pixels of the second display region are respectively connected to the scanning signal lines located on a signal input terminal side of the video signal lines to which the sources or drains of the TFT elements are connected relative to the pixel electrodes of the pixels.

9. The liquid crystal display device according to claim 8, wherein the second substrate has a light blocking film in net form which extends to such locations as to face of plurality of scanning signal lines and the plurality of video signal lines on the first substrate and locations through which the border line runs, and a size of a portion of the light blocking film extending to the location through which the border line runs in the direction in which the video signal lines extend is approximately the same as a size of a portion extending to such locations as to face the scanning signal lines in the direction in which the video signal lines extend.

* * * * *